(12) United States Patent
Byggmästar et al.

(10) Patent No.: US 11,740,140 B2
(45) Date of Patent: Aug. 29, 2023

(54) VELOCITY REGULATION OF THE CALIBRATOR BLOCK IN A DRY BLOCK CALIBRATOR

(71) Applicant: Beamex Oy Ab, Pietarsaari (FI)

(72) Inventors: Mats Byggmästar, Pietarsaari (FI); Taija Maunumäki, Kokkola (FI)

(73) Assignee: BEAMEX OY AB, Pietarsaari (FI)

( * ) Notice: Subject to any disclaimer, the term of this patent is extended or adjusted under 35 U.S.C. 154(b) by 400 days.

(21) Appl. No.: 17/080,593

(22) Filed: Oct. 26, 2020

(65) Prior Publication Data

US 2022/0128419 A1 Apr. 28, 2022

(30) Foreign Application Priority Data

Oct. 28, 2019 (FI) .................................... 20195925

(51) Int. Cl.
*G01K 15/00* (2006.01)
(52) U.S. Cl.
CPC ......... *G01K 15/002* (2013.01); *G01K 15/005* (2013.01)
(58) Field of Classification Search
CPC ...... G01K 15/002; G01K 15/005; G01K 3/10; G05D 23/1919
USPC ............................................................ 374/1
See application file for complete search history.

(56) References Cited

U.S. PATENT DOCUMENTS

| | | | |
|---|---|---|---|
| 2,975,261 A | 3/1961 | Keen et al. | |
| 3,939,687 A * | 2/1976 | Waldron | G05D 23/24 374/1 |
| 4,246,641 A * | 1/1981 | Babil | G01N 25/4826 374/1 |
| 4,501,125 A | 2/1985 | Han | |

(Continued)

FOREIGN PATENT DOCUMENTS

| | | |
|---|---|---|
| CN | 110234970 | 9/2019 |
| EP | 2350588 | 8/2011 |

(Continued)

OTHER PUBLICATIONS

European Search Report dated Jan. 11, 2021 for EP Application No. 20203759.4.

(Continued)

*Primary Examiner* — Gail Kaplan Verbitsky
(74) *Attorney, Agent, or Firm* — Thomas | Horstemeyer, LLP (57) ABSTRACT

The present invention discloses a method for regulating temperature in a temperature calibrator, taking into account also a velocity of the change of the temperature. The characterizing features are the steps of calculating a rate of change of the actual temperature of the temperature calibrator by a derivator, which derivator takes the measured temperature, $PV_T$, by the temperature sensor as its input, and letting a user to specify a maximum rate of change for the temperature, as an input value for the processor; and regulating the temperature of the temperature calibrator by the processor so that the maximum rate of change for the (Continued)

temperature is never exceeded, and so that during temperature regulation, when the temperature error signal decreases as a function of time, also the rate of change of the actual temperature is set to decrease as a function of time.

11 Claims, 7 Drawing Sheets

(56) References Cited

U.S. PATENT DOCUMENTS

| | | | | |
|---|---|---|---|---|
| 8,517,602 | B2* | 8/2013 | Courtois | G01K 15/00 374/112 |
| 10,302,497 | B2* | 5/2019 | Brunner | G01J 5/0255 |
| 2015/0338289 | A1 | 11/2015 | Friedrichs | |
| 2016/0174749 | A1 | 6/2016 | Eades et al. | |
| 2021/0123820 | A1* | 4/2021 | Maunumäki | G01K 15/002 |
| 2021/0123821 | A1* | 4/2021 | Laurila | G01K 15/005 |
| 2021/0123822 | A1* | 4/2021 | Maunumäki | G01K 15/005 |

FOREIGN PATENT DOCUMENTS

| | | | | |
|---|---|---|---|---|
| EP | 3739314 A1 | * | 11/2020 | G01K 15/002 |
| EP | 382600 A1 | * | 5/2021 | |
| EP | 3822600 A1 | * | 5/2021 | G01K 15/002 |
| FI | 129727 | * | 8/2022 | |
| WO | WO-9904231 A1 | * | 1/1999 | G01K 15/00 |

OTHER PUBLICATIONS

Search Report for Finnish Application No. 20195925 dated Jun. 24, 2020.

* cited by examiner

VELOCITY REGULATION OF THE CALIBRATOR BLOCK IN A DRY BLOCK CALIBRATOR

CROSS-REFERENCE TO RELATED APPLICATION

This application claims benefit of and priority to Finnish Application No. 20195925, filed, Oct. 28, 2019. The entire content of which is incorporated herein by reference.

TECHNICAL FIELD

The present invention relates to temperature calibrations, and such procedures applied in temperature calibrators (i.e. dry blocks), which are widely used in various industrial processes and plants, for instance.

BACKGROUND

Temperature calibrators are measurement units which can be made for industrial field use, and they can be manufactured as relatively small-sized units to be carriable around a plant, Temperature calibrators can also be called as dry blocks or dry block calibrators, meaning exactly the same. Temperature calibrators may be manufactured in different temperature range variations, e.g. by having a dry block which is suitable for calibrating temperatures of −25° C. . . . +150° C., and another dry block for calibrating temperatures of +50° C. . . . +660° C., to merely give some examples on different temperature range options.

The temperature in the calibrator block needs to be measured and regulated, and a part of the process is to create a stable temperature environment for the temperature probes (i.e. sensors) to be calibrated in the calibrator block.

Temperature regulation in a dry block is typically done with a PID regulator.

Figure 1:
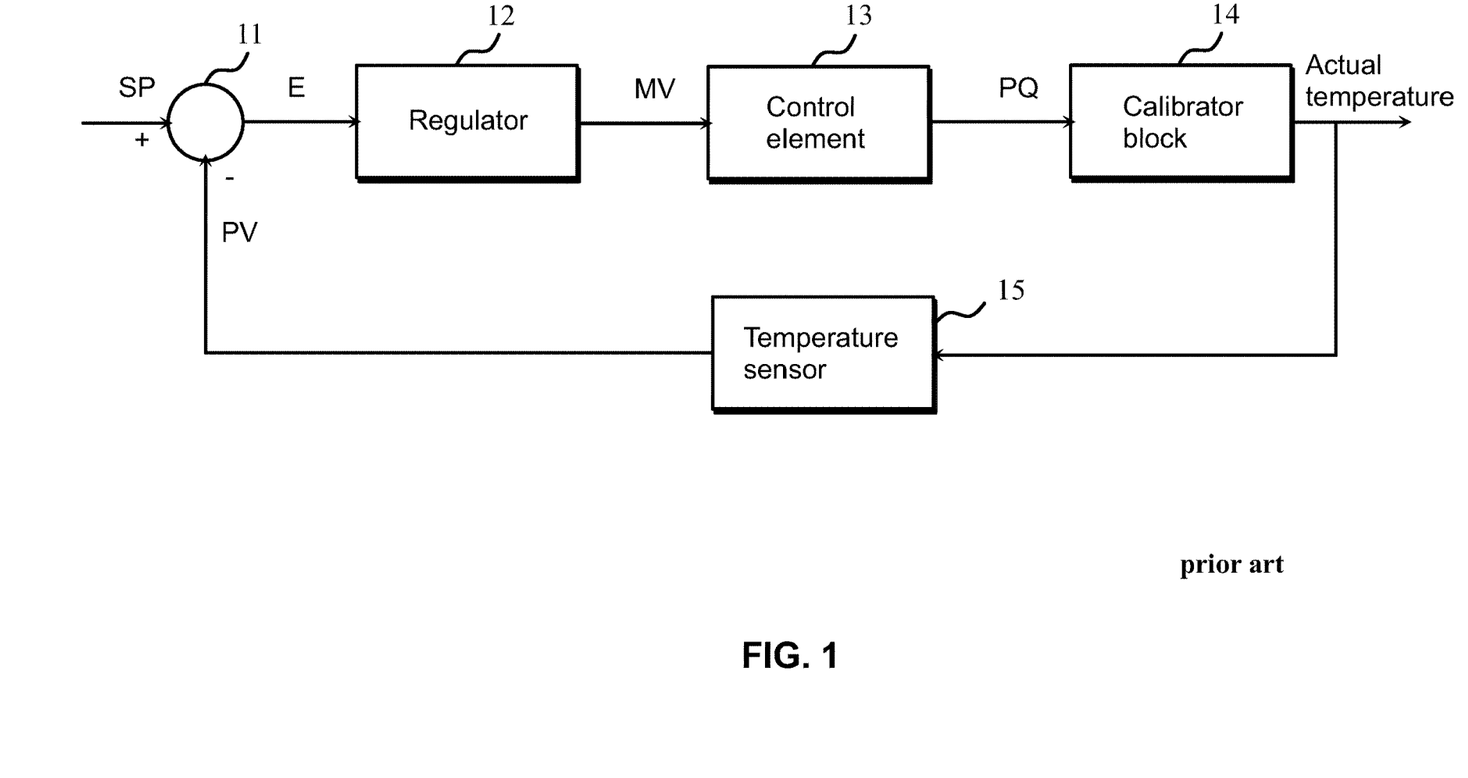
FIG. 1 illustrates a PID regulator according to prior art for regulating temperature of a calibrator block.

FIG. 1 illustrates a manner as a flow chart in which the temperature is usually regulated in a temperature calibrator (i.e. in a dry block), by using a PID regulator (i.e. a proportional-integral-derivative regulator). FIG. 1 is shown as a block diagram, which comprises a regulator 12, a control element 13, a calibrator block 14 and a temperature sensor 15. Furthermore, there is a summing block 11, and the calibrator block 14 outputs the actual temperature. The temperature sensor 15 output is marked as "PV", a Process Variable, i.e. the measured temperature of the calibrator block 14. "SP" is the Set Point, i.e. a wanted temperature of the calibrator block 14. "E" is the same as "SP" minus "PV" (in other words, E=SP−PV), meaning the temperature error signal fed into the regulator 12. "MV" is the Manipulated Variable, i.e. the output signal from the regulator 12 in a suitable unit, e.g. in Watts or Amperes. "MV" is fed into the control element 13, and the control element 13 outputs "PQ", which is the Physical Quantity, i.e. an actual physical quantity (such as power in Watts or current in Amperes) which causes the calibrator block 14 to change temperature. The control element 13 is thus a device which converts the output signal "MV" from the regulator 12 to an actual physical quantity (="PQ").

This type of simple regulation depicted in FIG. 1 often suffers from temperature oscillation in the calibrator block 14, when approaching the temperature set-point. Such oscillations, especially the overshoots, are not desirable for accurate temperature probe calibration, as overshoots may cancel out the temperature sensing hysteresis in the temperature probe to be calibrated. When we want to measure hysteresis, we must not cancel out the hysteresis.

Figure 2:
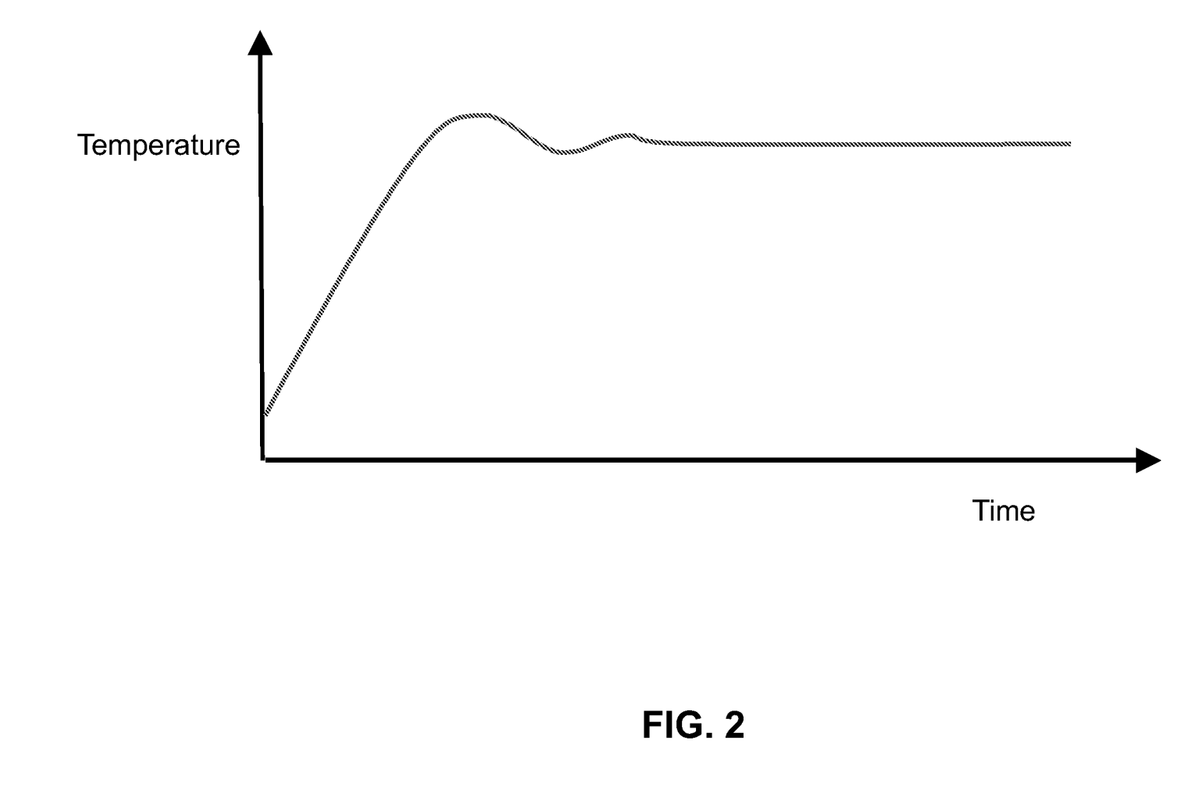
FIG. 2 illustrates temperature behavior with an overshoot.

FIG. 2 illustrates temperature behavior with an overshoot in an example of the situation using a PID regulator of FIG. 1, shown as a graph with time in an X-axis and temperature of the calibrator block in a Y-axis. As shown, the regulating action is "too quick" or "too harsh", resulting in the temperature going over the desired temperature in a relatively short time period, and thereafter resulting in an oscillating manner of the temperature, until the desired temperature is in practice reached after a certain oscillating time period.

If the PID regulator parameters are changed (i.e. adjusted) in order to make the PID regulator less aggressive, the oscillations can typically be reduced or removed totally. In other words, the temperature set-point changes can be made very slow by appropriate parameter adjustments using the PID regulator of FIG. 1.

Figure 3:
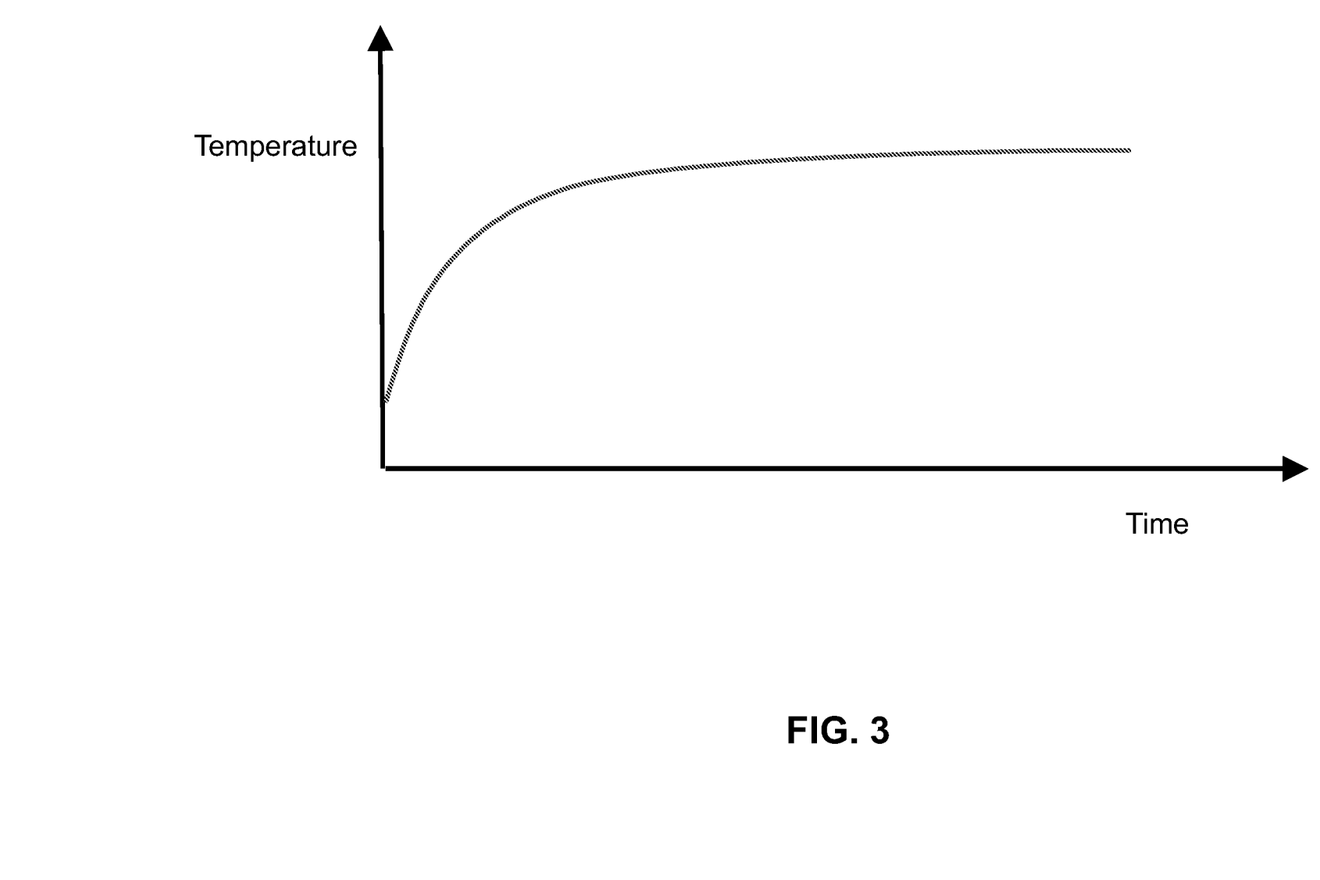
FIG. 3 illustrates temperature behavior with slow changes.

Such an adjusted, less aggressively behaving situation for the PI D regulator can be seen in the graph of FIG. 3. The slow changes of the temperature can be clearly seen, and there is no oscillation or overshoot over the desired temperature value. The temperature will slowly close down towards the desired temperature in an asymptotic fashion, without any overshoot. A drawback with using such PID regulator parameters is that the time to reach sufficient accuracy with the desired temperature can be relatively long.

The problem in prior art is that the PID regulating principle currently used in connection with temperature calibrators, is still too aggressive resulting in overshooting and oscillations, or too slow in reaching the finally desired temperature. There is thus a need to find a more optimal solution in temperature regulation applied in temperature calibrators.

SUMMARY OF THE INVENTION

It can be summarized that the present invention discloses a method for regulating temperature in a temperature calibrator, primarily focusing on regulating the velocity of the change of the temperature.

A method, an arrangement and a computer program are different aspects of the present invention.

According to a first aspect of the present invention, it introduces a method for regulating temperature in a temperature calibrator (14), the temperature calibrator (14) comprising a processor, wherein the method comprises the steps of:

measuring an actual temperature of the temperature calibrator (14) by a temperature sensor (15);

applying a temperature error signal to a regulator (12), the temperature error being a temperature set point minus a measured temperature, $PV_T$, by the temperature sensor (15); and feeding a regulator (12) output signal to a control element (13), which control element (13) converts the regulator (12) output signal into a physical quantity, PQ, which is output to the temperature calibrator (14) for regulating temperature.

The method is characterized in that the method further comprises the steps of:

calculating a rate of change of the actual temperature of the temperature calibrator (14) by a derivator (24), which derivator (24) takes the measured temperature, $PV_T$, by the temperature sensor (15) as its input;

letting a user to specify a maximum rate of change for the temperature, as an input value for the processor; and regulating the temperature of the temperature calibrator (14) by the processor so that the maximum rate of change for the temperature is never exceeded, and so that during temperature regulation, when the temperature error signal decreases as a function of time, also the rate of change of the actual temperature is set to decrease as a function of time.

According to a second aspect of the present invention, it introduces an arrangement for regulating temperature in a temperature calibrator (14), the temperature calibrator (14) comprising a processor, wherein the arrangement comprises:

a temperature sensor (15) configured to measure an actual temperature of the temperature calibrator (14);

a regulator (12) taking a temperature error signal as its input, the temperature error being a temperature set point minus a measured temperature, $PV_T$, by the temperature sensor (15); and a control element taking a regulator (12) output signal as its input, which control element (13) converts the regulator (12) output signal into a physical quantity, PQ, which is output to the temperature calibrator (14) for regulating temperature.

The arrangement is characterized in that the arrangement further comprises:

a derivator (24) configured to calculate a rate of change of the actual temperature of the temperature calibrator (14), which derivator (24) takes the measured temperature, $PV_T$, by the temperature sensor (15) as its input; and where a user is let to specify a maximum rate of change for the temperature, as an input value for the processor; and where the processor is configured to regulate the temperature of the temperature calibrator (14) so that the maximum rate of change for the temperature is never exceeded, and so that during temperature regulation, when the temperature error signal decreases as a function of time, also the rate of change of the actual temperature is set to decrease as a function of time.

According to a third aspect of the present invention, it introduces a computer program for regulating temperature in a temperature calibrator (14), the temperature calibrator (14) comprising a processor, and the computer program comprising program code and executable in the processor, wherein the computer program is configured to execute the steps of:

measuring an actual temperature of the temperature calibrator (14) by a temperature sensor (15);

applying a temperature error signal to a regulator (12), the temperature error being a temperature set point minus a measured temperature, $PV_T$, by the temperature sensor (15); and feeding a regulator (12) output signal to a control element (13), which control element (13) converts the regulator (12) output signal into a physical quantity, PQ, which is output to the temperature calibrator (14) for regulating temperature.

The computer program is characterized in that the computer program is further configured to execute the steps of:

calculating a rate of change of the actual temperature of the temperature calibrator (14) by a derivator (24), which derivator (24) takes the measured temperature, $PV_T$, by the temperature sensor (15) as its input;

letting a user to specify a maximum rate of change for the temperature, as an input value for the processor; and regulating the temperature of the temperature calibrator (14) by the processor so that the maximum rate of change for the temperature is never exceeded, and so that during temperature regulation, when the temperature error signal decreases as a function of time, also the rate of change of the actual temperature is set to decrease as a function of time.

Various embodiments are disclosed in dependent method claims, and these features can also be applied in a corresponding arrangement and in a corresponding computer program.

DETAILED DESCRIPTION OF THE INVENTION

The present invention represents a method for regulating the temperature in a calibrator block, which method is particularly suitable for dry block calibrators.

In the present invention in its various embodiments, the purpose is to, instead of regulating the temperature directly, regulate the temperature velocity (i.e. the rate of change of the temperature) using a PID regulator, and have the velocity set-point follow predetermined velocity paths, when approaching the temperature set-point.

In this way, the actual approaching process of the temperature set-point is under strict control. Far away from the temperature set-point the velocity can be high, but close to the temperature set-point, the desired velocity is decreased and very close to the temperature set-point, the desired velocity is reduced to almost zero, so that the temperature slowly crawls up to the temperature set-point without overshooting.

As the velocity is regulated, it is possible by design to let the user specify a maximum velocity that can be used during set-point changes. Certain high precision temperature probes require that the rate of change of the temperature is limited. Furthermore, velocity regulation allows us to create stable temperature ramps needed for calibrating the activation and deactivation points of temperature switches i.e. switches which activate or deactivate at certain temperatures. This is an advantage of the invention.

Figure 4:
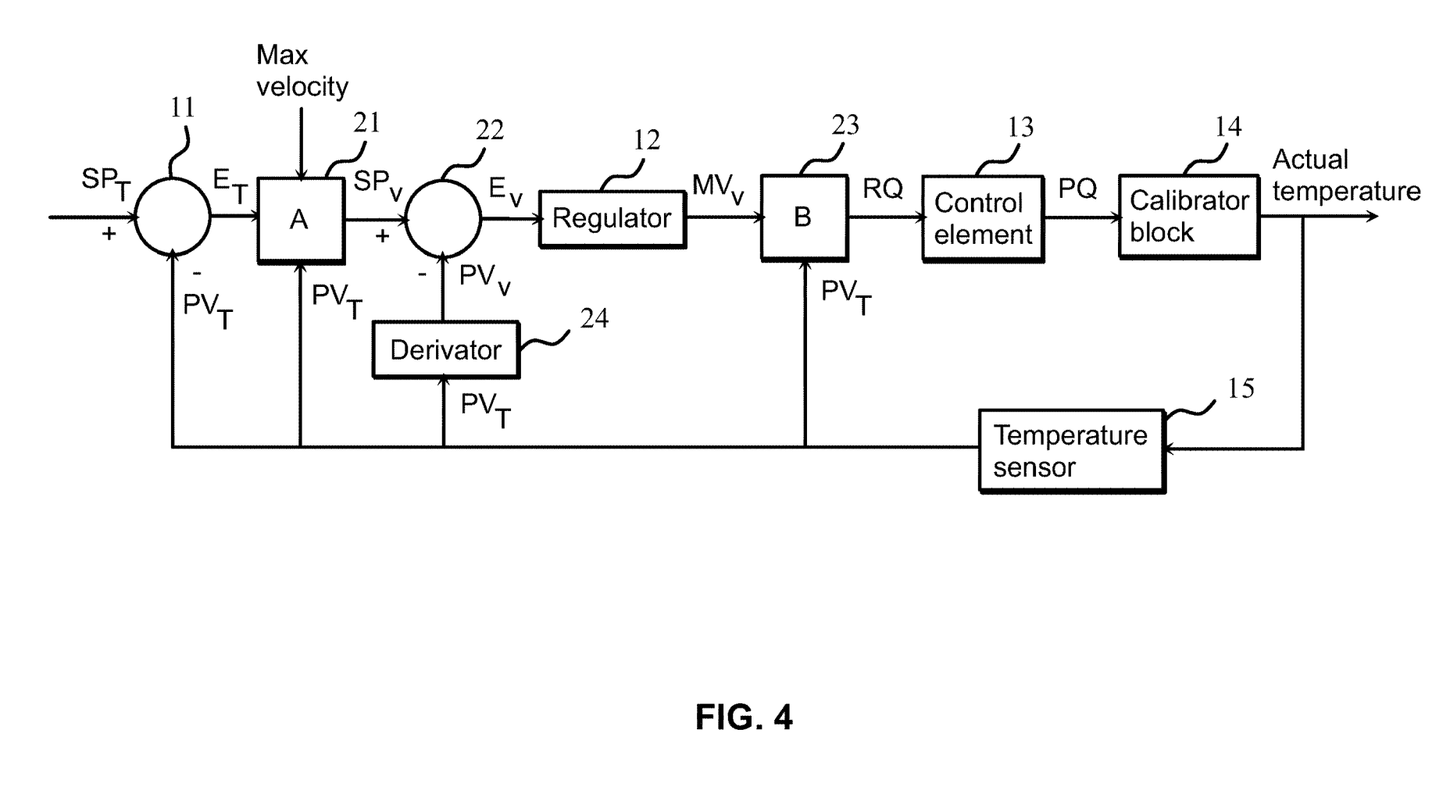
FIG. 4 illustrates a velocity regulator for the calibrator block in an embodiment of the present invention.

In an embodiment, a PID regulator according to the present invention may comprise the following functional elements as shown in FIG. 4.

The functional elements and signals inbetween them are disclosed in the following. Same functional elements, which were already discussed in connection with FIG. 1, are maintained with the same reference numberings in FIG. 4.

$SP_T$ is the Temperature Set Point, i.e. a wanted/desired temperature of the calibrator block 14. $SP_T$ is fed into a summing unit 11. Another signal entering the summing unit 11 (i.e. a first summing unit) is the $PV_T$, i.e. Temperature Process Variable, a measured temperature of the calibrator block 14, output by temperature sensor 15. The summing unit 11 calculates $E_T = SP_T - PV_T$, resulting in a Temperature Error signal fed into block "A" 21. The block "A" 21 outputs $SP_V$=Velocity Set Point, which is a wanted/desired temperature velocity in the calibrator block 14 eventually. $SP_V$ enter a second summing unit 22. "Max velocity" means a maximum temperature velocity [in unit ° C./s] which the block "A" 21 may output; this value is fixed and can be set by the user for the block "A" 21. $PV_V$ means a Velocity Process Variable, a measured temperature velocity [° C./s] in calibrator block 14. In other words, the temperature sensor 15 senses the actual temperature of the calibrator block 14, and a derivator 24 calculates and output its rate of change as a function of time, resulting in the Velocity Process Variable $PV_V$. In other words, derivator 24 converts the measured temperature into a measured temperature velocity (i.e. rate of change) [° C./s]. The second summing unit 22 will calculate $E_V=SP_V-PV_V$, resulting in a Velocity Error signal [° C./s] fed into a regulator 12. Along the signal flow, the next one is $MV_V$, i.e. Velocity Manipulated Variable, which is a velocity [° C./s] output signal from regulator 12. Next we have a block "B", which takes both the Velocity Manipulated Variable and the temperature sensor 15 output as its input signals. Note that blocks "A" 21 and "B" 23 are discussed in more detail in the following paragraphs.

Block "B" 23 will output "RQ", meaning a Regulated Quantity, i.e. a regulated quantity output from block "B" 23 in a suitable unit, e.g. in Watts or Amperes. This signal, RQ, is directed to the control element 13. As in the arrangement shown in FIG. 1, control element 13 will output "PQ" based on input "RQ" (not input MV anymore like in FIG. 1). In other words, "PQ" is a Physical Quantity, i.e. an actual physical quantity, such as power in Watts or current in Amperes, that causes the calibrator block 14 to change temperature. In yet other words, the control element 13 is a device that converts the output signal from block "B" 23 (=RQ) to an actual physical quantity (=PQ).

Blocks "A" 21, "B" 23 and derivator 24 are needed for having the regulator 12 operate in the so-called velocity domain which is called this way because the regulator is in this way elevated up to a higher domain. A base domain here would be the temperature itself, the velocity of the temperature change would be the next higher domain, and the temperature change acceleration would be the next higher domain. As the velocity of the temperature change is the derivative of the temperature as a function of time (and temperature change acceleration would be the derivative of the above velocity), derivator 24 is a main functional block in the embodiments of the present invention. Block "A" 21 continuously evaluates the calibrator block's 14 temperature state with respect to the temperature set-point and other factors, and provides a "wanted velocity" to be kept by the regulator 12. The regulator 12 then outputs a "corrected velocity" that block "B" 23 converts to a suitable electrical quantity. The conversion method may differ depending on the type of the calibrator block 14.

Block "A" 21 continuously calculates the velocity set-point $SP_V$ from the three input signals; $E_T$, $PV_T$ and Max velocity; and calculates the velocity set-point $SP_V$. The velocity set-point $SP_V$ is calculated so that the temperature in the calibrator block 14 will approach the temperature set-point without overshoots. The appropriate approach path is dependent on both the distance from the target set-point $E_T$ as well as the sensed temperature $PV_T$. Furthermore, $SP_V$ is limited to not exceed the Max velocity value in the discussed embodiment according to FIG. 4.

Block "B" 23 converts the regulator's 12 output velocity $MV_V$ into an output quantity (=RQ), such as power in Watts or current in Amperes.

In an embodiment of the present invention, where a dry block calibrator utilizes Peltier elements (a.k.a. thermoelectric coolers (TEC)) as heating elements (meaning that the calibrator block's typical temperature range is +150 . . . −30° C.), the output quantity from block "B" 23 is selected to be current in Amperes. The relationship between current and velocity at different calibrator block temperatures has been determined by measuring and characterizing an existing calibrator block assembly and the measurement data has been collected in a multi-dimensional lookup table, which block "B" 23 uses to convert between velocity in ° C./s and current in Amperes. The lookup table does not give a perfect conversion, but the velocity regulator will compensate for these conversion errors.

In yet another embodiment of the present invention, where a dry block calibrator utilizes cartridge heaters or in other words, resistive heaters, as heating elements (meaning that the calibrator block's typical temperature range is +660 . . . +50° C.), the output quantity from block "B" 23 is selected to be power in Watts. In this embodiment, the conversion is done according to the following mathematical principles, presented in equations (1)-(17) in the following paragraphs.

At first, a thermal energy equation over a time interval ($\Delta t$) is discussed.

The increase in the amount of thermal energy stored in the control volume must equal the amount of thermal energy that enters the control volume, minus the amount of thermal energy that leaves the control volume, plus the amount of thermal energy which is generated within the control volume. In other words, this can be expressed as:

$$\Delta E_{st}=E_{in}-E_{out}+E_g \quad (1)$$

Secondly, a Thermal Energy Equation at an Instant (t) is discussed.

The rate of increase of thermal energy stored in the control volume must equal the rate at which thermal energy enters the control volume, minus the rate at which thermal energy leaves the control volume, plus the rate of thermal energy which is generated within the control volume. In other words, this can be expressed as:

$$\dot{E}_{st} = \frac{dE_{st}}{dt} = \dot{E}_{in} - \dot{E}_{out} + \dot{E}_g \quad (2)$$

The rate of change of energy is the time derivative of equation (1).

Thirdly, Thermal Energy Equations in the Calibrator Block are discussed.

At a first sub-section there, a "Steady state" is discussed. At constant temperature, there is no increase in the amount of thermal energy and no energy is generated within the block i.e. $\Delta E_{st}=E_g=0$. Energy balance (1) has the following form:

$$E_{in}=E_{out} \quad (3)$$

This means that the energy in the heaters equals to the energy going out via heatloss. The unit in the equation (3) is joule [J].

Rate of change of energy is the time derivative of the above equation (3). The unit is [J/s]=[W]; i.e. Watt.

$$E'_{in}=E'_{out} \quad (4)$$

The energy entering the block comes from the heaters. Energy is leaving through natural conduction, convection and radiation. This means that the power in heaters ($E'_{in}$)

equals to total heatloss via natural conduction, convection and radiation ($E'_{out}$). It is impossible to differentiate between heat transfer mechanisms, that's why they are given as total heatloss $q_{tot}$:

$$P_{steady\text{-}state} = q_{tot} \quad (5)$$

Steady state power can be measured at different temperatures and given as a polynomial.

At a second sub-section there, "Heating" is discussed.

When heating or cooling, the amount of thermal energy stored in the block changes. Rate of change of thermal energy without energy generation can be expressed as:

$$\frac{dE_{st}}{dt} = \dot{E}_{in} - \dot{E}_{out} \quad (6)$$

Energy stored in the block and its time derivative equal:

$$E_{st} = mc_p(T_{setpoint} - T_{ambient}) \rightarrow \frac{dE_{st}}{dt} = mc_p \frac{dT}{dt} \quad (7)$$

So the equation (7) gets to the following form:

$$mc_p \frac{dT}{dt} = P_{heating} - q_{tot} \quad (8)$$

Again, $q_{tot}$ is the total heatloss including natural convection, radiation and conduction to other parts. It equals to steady state power that can be measured. Since we know the heating power $P_{heating}$ and heating speed can be easily measured, $mc_p$ can be calculated at different temperatures and given as a polynomial.

It has been noticed that the measured $mc_p$ varies depending on what heating speed it has been measured with.

Based on measured $mc_p$ and steady state power, as well as wanted heating speed, the following equation can be used to calculate the applied power:

$$P_{heating} = mc_p \frac{dT}{dt} + q_{tot} \quad (9)$$

At a third sub-section there, "Free cooling" is discussed.

In free cooling, there is no energy entering the block ($E'_{in}=0$). The equation for rate of change of thermal energy has the following form:

$$\frac{dE_{st}}{dt} = -\dot{E}_{out} \quad (10)$$

$$mc_p \frac{dT}{dt} = -q_{tot} \quad (11)$$

Since we know that $q_{tot}$ equals steady state power and cooling speed dT/dt can be measured, an estimate of $mc_p$ can be calculated. It has been noticed that the values measured in heating seem to be useful also in cooling with reasonable accuracy.

At a fourth sub-section there, "Forced cooling" is discussed.

When cooling with the fan, the forced convection overrides the natural convection so $q_{tot}$ is not a part of the equation. The equation for rate of change of thermal energy has the following form:

$$\frac{dE_{st}}{dt} = -\dot{E}_{out} \quad (12)$$

$$mc_p \frac{dT}{dt} = -q_{forced} \quad (13)$$

Since the cooling speed can be measured and we already have an estimate for the $mc_p$, the total heatloss with forced convection (including conduction and radiation) can be calculated.

Finally, at a fifth sub-section there, "Controlled cooling" is discussed.

Controlled cooling means applying power in heaters when cooling (i.e. simultaneous cooling and heating). The equation for rate of change of thermal energy has the following form:

$$\frac{dE_{st}}{dt} = \dot{E}_{in} - \dot{E}_{out} \quad (14)$$

$$mc_p \frac{dT}{dt} = P_{heating} - q_{forced} \quad (15)$$

Dividing the equations by $mc_p$ gives an expression for the cooling speed dT/dt. The first term on the right-hand side corresponds to "power velocity" i.e. heating speed that would be caused by the applied power, and the last term $q_{forced}/mc_p$ corresponds to the cooling speed caused by the fan:

$$\frac{dT}{dt} = \frac{P_{heating}}{mc_p} - \frac{q_{forced}}{mc_p} \quad (16)$$

So the applied power can be calculated when we know the wanted velocity dT/dt and the cooling speed caused by the fan:

$$P_{heating} = \left(\frac{dT}{dt} + \frac{q_{forced}}{mc_p}\right) mc_p \quad (17)$$

Figure 5A:
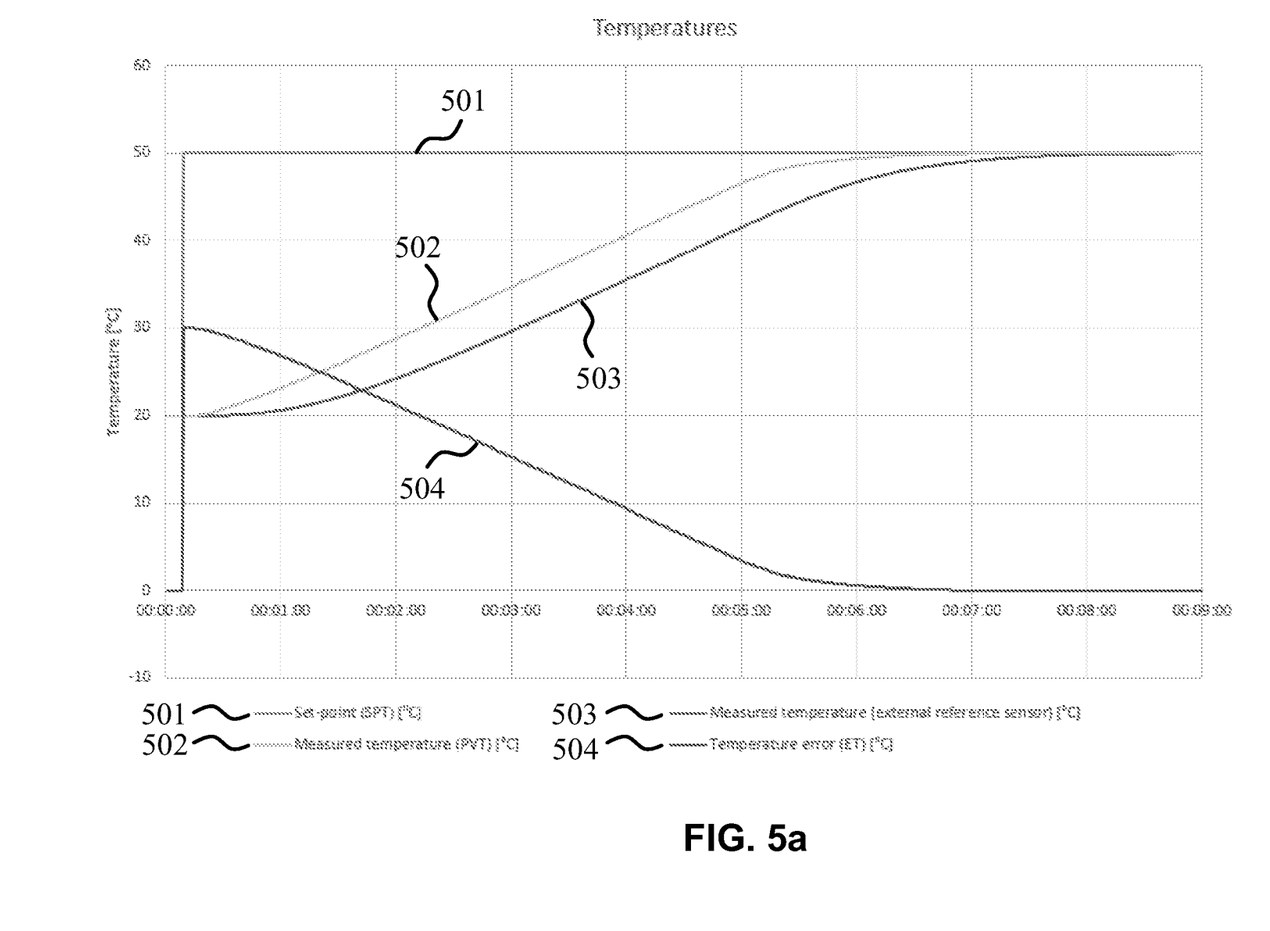
FIGS. 5a-c illustrate actual measurement results concerning the velocity regulator implementation relating to temperature changes, for the "cold" dry block utilizing Peltier elements in an embodiment of the invention.
Figure 5B:
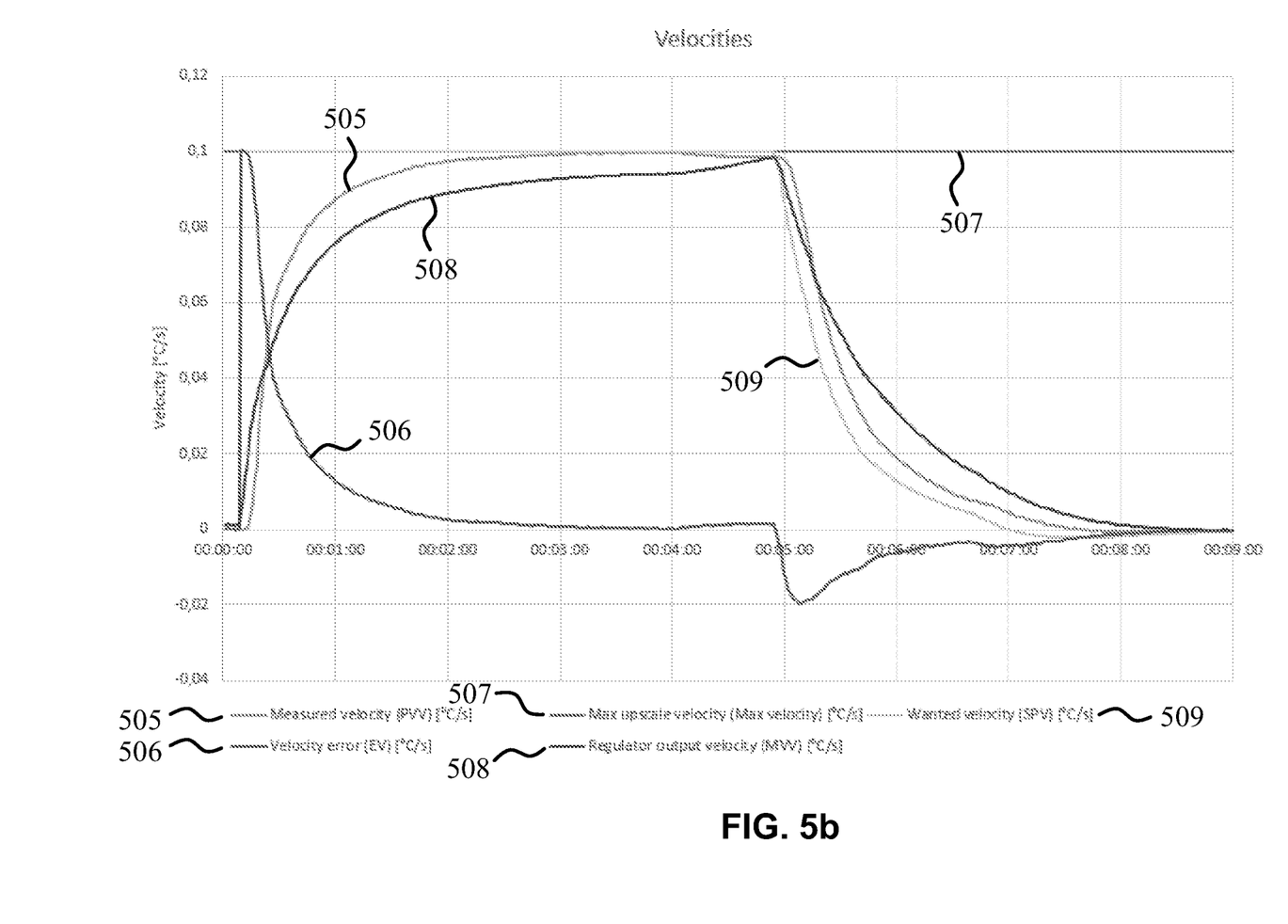
Figure 5C:
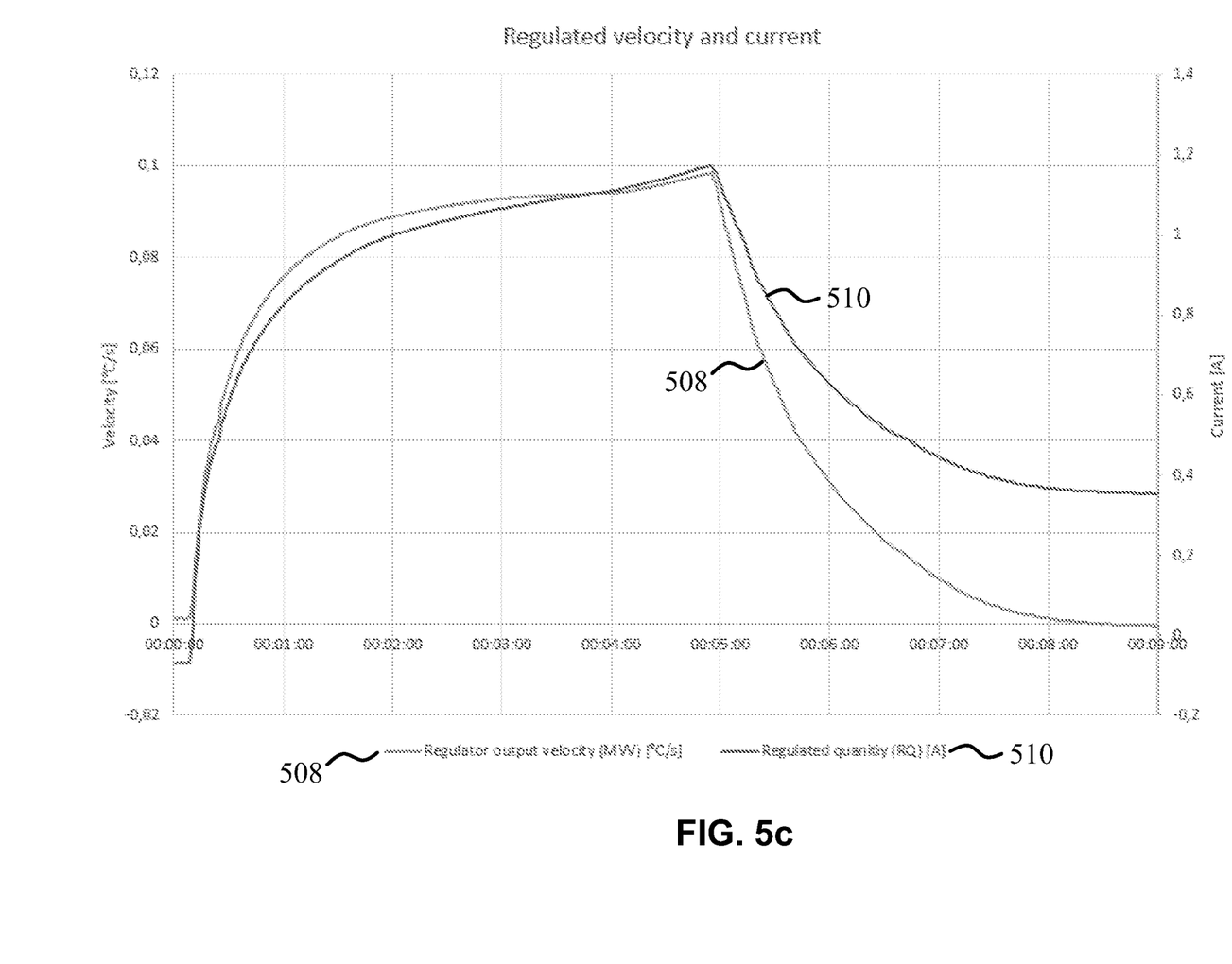

Finally, FIGS. 5a-c illustrate actual measurement results concerning the velocity regulator implementation relating to temperature changes, for the "cold" dry block utilizing Peltier elements in an embodiment of the invention.

The measurements have been performed at a set-point change from 20° C. to 50° C., when the user has limited the velocity by setting "Max velocity" to 0,1° C./s. The set-point change takes approximately 9 minutes to complete.

FIG. 5a shows graphs representing temperatures: $SP_T$, $PV_T$, $E_T$ and a temperature measurement inside the calibrator block insert using an external reference sensor (this measurement corresponds closely to the "Actual temperature", which the sensors to be calibrated experience). The notation corresponds to the one presented earlier in the disclosure. Here we can notice the time-lag between the external reference sensor in the insert and the $PV_T$ sensor (which is the internal reference sensor in the calibrator block). This is because these two sensors are at different locations in the thermodynamic assembly. The $PV_T$ sensor is closer to the heating and cooling sources (the Peltier elements in this measurement), and therefore it registers changes in temperature sooner than the external reference sensor.

FIG. 5b shows graphs representing velocities in ° C./s: $PV_V$, $E_V$, Max velocity, $MV_V$ and $SP_V$. The notation corresponds to the one presented earlier in the disclosure here as well.

FIG. 5c shows regulator output velocity $MV_V$ in the y-axis on the left, and regulated quantity RQ in the y-axis on the right. The velocity is shown in ° C./s and the regulated quantity RQ is shown as a current in A.

It is notable in FIG. 5c that when considering the time up to about 00:05:00 minutes, the velocity has been limited by "Max velocity" (line 510), but after about 00:05:00 minutes, the wanted velocity ($SP_V$) will follow the set-point approach slope (implemented in block "A" 21) that limits the velocity more and more the closer the temperature gets to the temperature set-point, to avoid overshoots.

It is thus verified that the present invention works indeed as planned.

Aspects of the present invention thus comprise a method for temperature velocity regulation in temperature calibrators, and a temperature velocity regulator in temperature calibrators. The method can be applied by software (i.e. a computer program, and/or a respective computer program product), which can be stored in a memory of the temperature calibrator, and executed by a processor or controller controlling the temperature calibrator. The temperature calibrator may have an I/O interface like a keyboard and a screen, or a touch screen for information feeding and presenting. The temperature calibrator may also have output connection means for wired or wireless communication means for information transfer e.g. to a remote computer or server in the cloud. Wireless transfer means then also comprises appropriate radio signal transmission means, comprising an antenna as well.

The present invention is not restricted merely to embodiments presented above, but the present invention may vary within the scope of the claims.

The invention claimed is:

1. A method for regulating temperature in a dry block calibrator, the dry block calibrator comprising a processor, wherein the method comprises the steps of:
   measuring a temperature of the dry block calibrator by a temperature sensor;
   applying a temperature error signal to a regulator, the temperature error being a temperature set point minus the measured temperature, $PV_T$, by the temperature sensor; and
   feeding a regulator output signal to a control element, which control element converts the regulator output signal into a physical quantity, PQ, which is output to the dry block calibrator for regulating temperature;
   wherein the method further comprises the steps of:
   calculating a rate of change of the actual temperature of the dry block calibrator by a derivator, which the derivator takes the measured temperature, $PV_T$, by the temperature sensor as its input;
   letting a user to specify a maximum rate of change for the temperature, as an input value for the processor; and
   regulating the temperature of the dry block calibrator by the processor so that the maximum rate of change for the temperature is never exceeded, and so that during temperature regulation, when the temperature error signal decreases as a function of time, also the rate of change of the actual temperature is set to decrease as a function of time.

2. The method according to claim 1, wherein the regulating of the temperature of the dry block calibrator is performed with the regulator, which takes as its inputs the temperature error signal, the measured temperature, $PV_T$, by the temperature sensor, and the calculated rate of change of the temperature by the derivator.

3. The method according to claim 1, wherein a first functional element takes the measured temperature, $PV_T$, the temperature error signal, $E_T$, and the specified maximum rate of change for the temperature as its inputs, and the first functional element outputs a velocity set point, $SP_V$.

4. The method according to claim 3, wherein the velocity set point, $SP_V$, minus the calculated rate of change by the derivator, is fed to the regulator as a velocity error signal, $E_V$.

5. The method according to claim 4, wherein a second functional element takes the regulator output, which is a velocity manipulated variable, $MV_V$, and the measured temperature, $PV_T$, as its inputs, and the second functional element outputs a regulated quantity, RQ, into the control element.

6. The method according to claim 5, wherein the dry block calibrator comprises Peltier elements as heating elements, when the regulated quantity, RQ, is current in Amperes.

7. The method according to claim 6, wherein a conversion between the velocity manipulated variable, $MV_V$, in ° C./s and the current, RQ, in Amperes made by the second functional element is performed by applying a lookup table, which lookup table has been filled by measuring an existing dry block calibrator earlier.

8. The method according to claim 5, wherein the dry block calibrator comprises resistive heaters as heating elements, when the regulated quantity, RQ, is power in Watts.

9. The method according to claim 8, wherein a conversion between the velocity manipulated variable, $MV_V$, in ° C./s and the power, RQ, in Watts made by the second functional element is performed by applying a plurality of thermal energy equations.

10. An arrangement for regulating temperature in a dry block calibrator, the dry block calibrator comprising a processor, wherein the arrangement comprises:
   a temperature sensor configured to measure a temperature of the dry block calibrator;
   a regulator taking a temperature error signal as its input, the temperature error being a temperature set point minus the measured temperature, $PV_T$, by the temperature sensor; and
   a control element taking a regulator output signal as its input, which control element converts the regulator output signal into a physical quantity, PQ, which is output to the dry block calibrator for regulating temperature;
   wherein the arrangement further comprises:
   a derivator calculating a rate of change of the actual temperature of the dry block calibrator, which the derivator takes the measured temperature, $PV_T$, by the temperature sensor as its input; and where
   a user is let to specify a maximum rate of change for the temperature, as an input value for the processor; and where
   the processor is regulating the temperature of the dry block calibrator so that the maximum rate of change for the temperature is never exceeded, and so that during temperature regulation, when the temperature error signal decreases as a function of time, also the rate of change of the actual temperature is set to decrease as a function of time.

11. A computer program product for regulating temperature in a dry block calibrator, the dry block calibrator comprising a processor, and the computer program product comprising program code and executable in the processor, wherein the computer program product is configured to execute the steps of:

measuring a temperature of the dry block calibrator by a temperature sensor;

applying a temperature error signal to a regulator, the temperature error being a temperature set point minus the measured temperature, $PV_T$, by the temperature sensor; and feeding a regulator output signal to a control element, which control element converts the regulator output signal into a physical quantity, PQ, which is output to the dry block calibrator for regulating temperature;

wherein the computer program product is further configured to execute the steps of:

calculating a rate of change of the actual temperature of the dry block calibrator by a derivator, which the derivator takes the measured temperature, $PV_T$, by the temperature sensor as its input;

letting a user to specify a maximum rate of change for the temperature, as an input value for the processor; and regulating the temperature of the dry block calibrator by the processor so that the maximum rate of change for the temperature is never exceeded, and so that during temperature regulation, when the temperature error signal decreases as a function of time, also the rate of change of the temperature is set to decrease as a function of time.

* * * * *